(12) United States Patent
Banka et al.

(10) Patent No.: US 9,658,997 B2
(45) Date of Patent: May 23, 2017

(54) PORTABLE PAGE TEMPLATE

(75) Inventors: Sharad Banka, Hooghly (IN); Mayur Hemani, New Delhi (IN); Hemant Virmani, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 12 days.

(21) Appl. No.: 12/849,475

(22) Filed: Aug. 3, 2010

(65) Prior Publication Data
US 2013/0132817 A1 May 23, 2013

(51) Int. Cl.
*G06F 17/00* (2006.01)
*G06F 17/24* (2006.01)

(52) U.S. Cl.
CPC .................................. *G06F 17/248* (2013.01)

(58) Field of Classification Search
CPC ...................................................... G06F 17/211
USPC ......................................................... 715/234
See application file for complete search history.

(56) References Cited

U.S. PATENT DOCUMENTS

| | | | |
|---|---|---|---|
| 6,128,655 A | 10/2000 | Fields et al. | |
| 6,266,684 B1 | 7/2001 | Kraus et al. | |
| 7,206,784 B2 | 4/2007 | Gu et al. | |
| 7,231,593 B1 | 6/2007 | Raja et al. | |
| 7,237,188 B1 | 6/2007 | Leung | |
| 7,366,981 B2 | 4/2008 | Wu et al. | |
| 7,599,094 B2 | 10/2009 | Sellers et al. | |
| 7,680,858 B2 * | 3/2010 | Poola et al. | 707/736 |
| 7,882,427 B2 | 2/2011 | Raja et al. | |
| 7,907,151 B2 | 3/2011 | Daviss | |
| 8,024,412 B2 | 9/2011 | McCann et al. | |
| 8,085,421 B2 | 12/2011 | Hamilton, II et al. | |
| 8,305,653 B2 | 11/2012 | Austin et al. | |
| 8,397,155 B1 | 3/2013 | Szabo | |
| 8,407,579 B2 | 3/2013 | Raja et al. | |
| 8,451,489 B1 | 5/2013 | Arora | |
| 8,467,082 B1 | 6/2013 | Miller et al. | |
| 8,705,092 B2 | 4/2014 | Goel et al. | |
| 8,767,255 B2 | 7/2014 | Ha et al. | |
| 8,773,712 B2 | 7/2014 | Chopra et al. | |
| 8,799,761 B2 | 8/2014 | Goel et al. | |

(Continued)

OTHER PUBLICATIONS

Invent Wheel: Dec. 24, 2008, pp. 1-3. Also available at: http://www.inventwheel.com/web/articleDetailsByVersion.action?versionId=8.*

(Continued)

*Primary Examiner* — Shawn S Joseph
(74) *Attorney, Agent, or Firm* — Wolfe-SBMC

(57) ABSTRACT

Similarity between a first web document and a second web document based on a similarity threshold is determined. The second web document has a portable page template associated therewith that includes one or more predetermined transformations that were previously applied to the second web document. In addition, one or more objects in the second web document are addressed upon the similarity threshold being met such that a tolerance threshold for one or more modifications to the second web document is met. A user is provided with the portable page template after the addressing of the one or more objects in the web document so that the portable page template automatically applies the one or more transformations, which were previously applied to the second web document, to the first web document.

20 Claims, 12 Drawing Sheets

(56) References Cited

U.S. PATENT DOCUMENTS

| | | | |
|---|---|---|---|
| 9,032,284 | B2 | 5/2015 | Arora et al. |
| 2002/0135800 | A1 | 9/2002 | Dutta |
| 2003/0110227 | A1 | 6/2003 | O'Hagan |
| 2003/0163285 | A1* | 8/2003 | Nakamura ........ G06F 17/30911 702/179 |
| 2003/0163537 | A1 | 8/2003 | Rohall et al. |
| 2004/0017577 | A1 | 1/2004 | Ostrover et al. |
| 2004/0019699 | A1 | 1/2004 | Dam et al. |
| 2004/0044735 | A1 | 3/2004 | Hoblit |
| 2004/0049730 | A1 | 3/2004 | Ishizaka |
| 2004/0068698 | A1 | 4/2004 | Wu et al. |
| 2004/0205607 | A1 | 10/2004 | Kim et al. |
| 2005/0004990 | A1 | 1/2005 | Durazo et al. |
| 2005/0231758 | A1 | 10/2005 | Reynolds |
| 2006/0015804 | A1 | 1/2006 | Barton et al. |
| 2006/0167976 | A1 | 7/2006 | Brown et al. |
| 2007/0127064 | A1 | 6/2007 | Kuroshima |
| 2007/0273895 | A1 | 11/2007 | Cudd et al. |
| 2008/0086695 | A1 | 4/2008 | Oral |
| 2008/0137132 | A1 | 6/2008 | Perronnin |
| 2008/0159768 | A1 | 7/2008 | Katoh et al. |
| 2008/0288860 | A1 | 11/2008 | Daviss |
| 2009/0063245 | A1 | 3/2009 | Anderson |
| 2009/0100374 | A1 | 4/2009 | Sheasby et al. |
| 2009/0119272 | A1 | 5/2009 | Sastry |
| 2009/0249193 | A1 | 10/2009 | Hanechak |
| 2010/0027051 | A1 | 2/2010 | Hamilton, II et al. |
| 2010/0079510 | A1 | 4/2010 | Dibiase et al. |
| 2010/0123908 | A1 | 5/2010 | Denoue et al. |
| 2010/0188681 | A1 | 7/2010 | Kawano |
| 2010/0214614 | A1 | 8/2010 | Ferlitsch et al. |
| 2010/0235456 | A1 | 9/2010 | Uchiyama et al. |
| 2010/0281351 | A1 | 11/2010 | Mohammed |
| 2011/0032562 | A1 | 2/2011 | McCuen et al. |
| 2011/0043831 | A1 | 2/2011 | Sprague et al. |
| 2011/0145085 | A1 | 6/2011 | Khachatrian et al. |
| 2011/0235064 | A1 | 9/2011 | Arai |
| 2011/0273739 | A1 | 11/2011 | Grasso et al. |
| 2012/0002226 | A1 | 1/2012 | Zhan |
| 2012/0033237 | A1 | 2/2012 | Arora et al. |
| 2013/0128301 | A1 | 5/2013 | Goel et al. |
| 2013/0128314 | A1 | 5/2013 | Chopra et al. |
| 2013/0128315 | A1 | 5/2013 | Arora et al. |
| 2013/0132812 | A1 | 5/2013 | Goel et al. |

OTHER PUBLICATIONS

Remick, Jarel: "Printing Pages with Print What You Like", Mar. 2, 2010, pp. 1-14. Also available at: http://web.appstorm.net/how-to/printing-pages-with-print-what-you-like/.*

Henry, Alan: "Print Friendly for Chrome Lets You Easily Remove Web paghe Elements Before Printing", Dec. 7, 2011, pp. 1-3. Also available at: http://lifehacker.com/5865826/print-friendly-for-chrome-lets-you-easily-remove-unwanted-web-page-elements-before-printing.* www.printwhatyoulike.com, Aug. 2, 2010, pp. 1-2.

"Final Office Action", U.S. Appl. No. 12/849,231, (Oct. 24, 2012), 11 pages.

"Final Office Action", U.S. Appl. No. 12/849,349, (Oct. 24, 2012), 14 pages.

"Non-Final Office Action", U.S. Appl. No. 12/849,231, (May 21, 2012), 12 pages.

"Non-Final Office Action", U.S. Appl. No. 12/849,306, (Oct. 9, 2012), 11 pages.

"Non-Final Office Action", U.S. Appl. No. 12/849,349, (May 21, 2012), 14 pages.

"Non-Final Office Action", U.S. Appl. No. 12/849,417, (Dec. 5, 2012), 12 pages.

Frye, Curtis D., "Excel Annoyances: Print Layout Annoyances", retrieved from <academic.safaribooksonline.com/print?xmlid=0596007280/excelannoyances-CHP-7-SECT-2> on May 14, 2012, 18 pages.

"Advisory Action", U.S. Appl. No. 12/849,417, Nov. 14, 2013, 2 pages.

"Notice of Allowance", U.S. Appl. No. 12/846,417, Jan. 7, 2014, 8 pages.

"Notice of Allowance", U.S. Appl. No. 12/849,306, Nov. 22, 2013, 8 pages.

"Notice of Allowance", U.S. Appl. No. 12/849,349, Apr. 11, 2014, 15 pages.

"Final Office Action", U.S. Appl. No. 12/849,231, (Sep. 26, 2013), 17 pages.

"Final Office Action", U.S. Appl. No. 12/849,349, (Aug. 19, 2013), 16 pages.

"Final Office Action", U.S. Appl. No. 12/849,417, (Sep. 4, 2013), 13 pages.

"Final Office Action", U.S. Appl. No. 12/849,306, (Apr. 25, 2013), 14 pages.

"Non-Final Office Action", U.S. Appl. No. 12/849,231, (Mar. 18, 2013), 14 pages.

"Non-Final Office Action", U.S. Appl. No. 12/849,349, (Mar. 18, 2013), 15 pages.

"Non-Final Office Action", U.S. Appl. No. 12/849,519, (Mar. 1, 2013), 5 pages.

"Notice of Allowance", U.S. Appl. No. 12/849,519, (Apr. 15, 2013), 7 pages.

"Notice of Allowance", U.S. Appl. No. 12/849,231, Feb. 9, 2015, 14 pages.

"Non-Final Office Action", U.S. Appl. No. 12/849,231, Oct. 2, 2014, 23 pages.

* cited by examiner

PORTABLE PAGE TEMPLATE

BACKGROUND

1. Field

This disclosure generally relates to display of content. More particularly, the disclosure relates to the display of web content.

2. General Background

Recent attempts have been made to make technology more environmentally friendly. The resulting technologies are typically called green technologies. For example, green technologies have been developed for computers, automobiles, household appliances, etc.

With respect to computing technologies, a significant environmental concern stems from the printing of paper. Computer users may use compute printers to print large quantities of various types of documents, which typically leads to the use of large amounts of paper. A large demand for paper may lead to the destruction of large quantities of trees, which may have a negative impact on the environment.

As a result, computer users are typically encouraged to reduce the amount of paper utilized for printing by scaling multiple pages down to fit on a single page. A problem with this approach is that the readability and aesthetics of the page are severely hampered. A user may have such a difficult time reading text that has been miniaturized so that two or more pages may fit on one side of a sheet of paper (the other side may also have two or more pages) that the user may simply choose not to utilize green printing and may print in the typical manner, which would not be environmentally friendly.

SUMMARY

In one aspect of the disclosure, a computer program product is provided. The computer program product includes a computer useable medium having a computer readable program. The computer readable program when executed on a computer causes the computer to determine similarity between a first web document and a second web document based on a similarity threshold. The second web document has a portable page template associated therewith that includes one or more predetermined transformations that were previously applied to the second web document. In addition, the computer readable program when executed on the computer causes the computer to address one or more objects in the second web document upon the similarity threshold being met such that a tolerance threshold for one or more modifications to the second web document is met. The computer readable program when executed on the computer also causes the computer to provide a user with the portable page template after the addressing of the one or more objects in the web document so that the portable page template automatically applies the one or more transformations, which were previously applied to the second web document, to the first web document.

In another aspect of the disclosure, a process is provided. The process determines, with a processor, similarity between a first web document and a second web document based on a similarity threshold. The second web document has a portable page template associated therewith that includes one or more predetermined transformations that were previously applied to the second web document. In addition, the process addresses, with the processor, one or more objects in the second web document upon the similarity threshold being met such that a tolerance threshold for one or more modifications to the second web document is met. The process also provides provide a user with the portable page template after the addressing of the one or more objects in the web document so that the portable page template automatically applies the one or more transformations, which were previously applied to the second web document, to the first web document.

In yet another aspect of the disclosure, a system is provided. The system includes a processor that determines similarity between a first web document and a second web document based on a similarity threshold and addresses one or more objects in the second web document upon the similarity threshold being met such that a tolerance threshold for one or more modifications to the second web document is met. The second web document has a portable page template associated therewith that includes one or more predetermined transformations that were previously applied to the second web document. In addition, the system includes an output module that provides a user with the portable page template after the addressing of the one or more objects in the web document so that the portable page template automatically applies the one or more transformations, which were previously applied to the second web document, to the first web document.

DRAWINGS

The above-mentioned features of the present disclosure will become more apparent with reference to the following description taken in conjunction with the accompanying drawings wherein like reference numerals denote like elements and in which.

DETAILED DESCRIPTION

A display configuration is provided herein that displays and/or prints web content. In other words, only the relevant content from a web page is displayed and/or printed. In one embodiment, the display configuration automatically captures the most relevant content from a web page. Further, the display configuration may include one or more user tools that allow a user to easily select the content that the user would like to print. As an example, the one or more user tools may be part of a toolbar. The set of transformations that is performed by a user on a particular web page may be saved as a page template, which allows the user or other users to quickly select the same or similar content on the same page. The page template may also allow the user or other users to quickly select the same or similar content on a page with a similar structure rather than the exact same page. The display configuration may be a method, system, computing device, computer program stored on a computing device, computer program stored on a printer, computer module that may be downloaded through a network, plug-in, extension, etc. In one embodiment, a user may print in a single click to a default printer so that the content takes up fewer pages and/or less ink than a typical printed document.

Content repurposing may minimize or eliminate redundant white space in a web page. Further, content repurposing may reduce the size of large text in a web page. In other words, content repurposing automatically adjusts the format of the content according to the adjustments that a user would most likely want to see in order to reduce the number of pages in the web page so that the user can still comfortably read the document.

A transformation may have a magnitude associated therewith. In one embodiment, the magnitude may be binary. The binary magnitude may indicate whether a transformation is applied or not applied, e.g., "0" equals transformation is not to be applied and "1" equals transformation is to be applied. In another embodiment, the magnitude may have a set of predefined discrete values. In another embodiment, the magnitude may take continuous values.

Each instance of a transformation type may have a transformation cost associated therewith for a particular document type. In other words, a particular sizing transformation may have a different transformation cost for a word processing document than for a spreadsheet.

Further, each transformation may have an associated paper saving potential. For example, a particular textual transformation may save one tenth of a sheet of paper. In addition, each transformation may have an associated saved ink quantity. For example, a particular textual transformation may save one half an ounce of ink. The transformation may potentially have both a saved paper potential and a saved ink quantity if both paper and ink would be saved as a result of the transformation.

Figure 1:
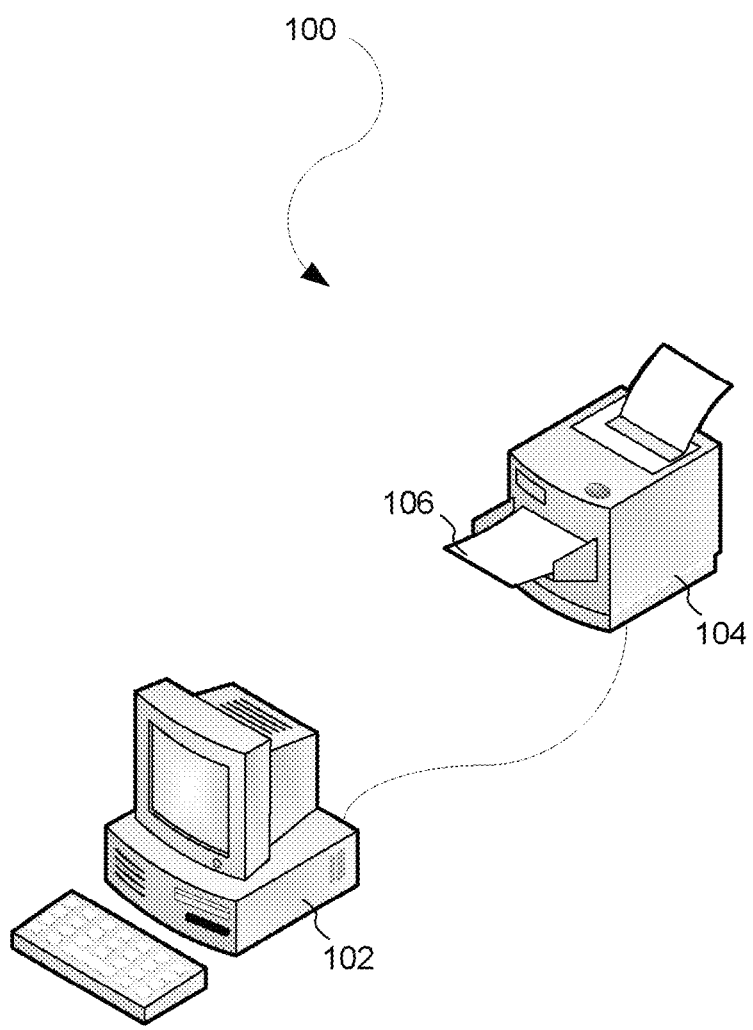
FIG. 1 illustrates a display configuration.

FIG. 1 illustrates a display configuration 100. As an example, a computing device 102 is illustrated as a PC. Further, as an example, the computing device 102 may optionally be operably connected to a printer 104 through a wireline connection. The display configuration 100 may display web content on a video display and may also print the web content on the printer 104. The term computing device 102 is herein intended to include a personal computer ("PC"), desktop computer, laptop, notebook, cell phone, smart phone, personal digital assistant ("PDA"), kiosk, etc. Further, the computing device 102 may be a client, server, network device, etc. The printer 104 may be a printing device that is separately connected, e.g., through a wireline or wireless connection, to the computing device 102, built into the computing device 102, etc. A wireless connection may receive and/or send data through a Radio Frequency ("RF") transmission, an Infrared ("IR") transmission, or the like. The printer may or may not be part of a network.

Further, the printer 104 may utilize any type of printing methodology to print on paper 106, e.g. laser printing, ink jet printing, or the like.

A web page may have a large quantity of content that a user may not want to print. For example, a user may be interested in printing a story from a news web site, but may not want to print the advertisements on the web page. The display configuration 100 allows the user to save the transformations that the user makes to a web page so that the user can revisit that web page or a different web page at the web site hosting the web page and apply the same transformations from the page template. As the page template is portable to similar types of web pages, the page template is referred to as a portable page template.

In order to reuse the transformations done on one page on other pages of the similar structure, the display configuration 100 determines if a given page is similar to another previously visited page and tolerates changes through an addressing mechanism for objects on the web pages. The two web pages in question are similar in structure, but not necessarily in content.

In one embodiment, the display configuration 100 utilizes a heuristic matching of Uniform Resource Locators ("URLs") of pages of a same web site. The heuristic matching determines the similarity since most web sites that have printable content work through a database of content and the URLs generated for different pages indicate the key elements that are utilized to index the content. As an example, on a news web site, all the articles may be indexed first by geography and second by time of reporting. The resulting URL may have the structure http://[hostname]/news/[geo]/[date]/[articleNumber.html]. Further, in one embodiment, a hierarchical structure of a web page is utilized to address objects in a unique way that is tolerant of changes on the web page for the same web site. In addition, the hierarchical structure of a web page is utilized to address objects in unique manner that is tolerant to changes on web page.

Accordingly, the display configuration 100 allows a one or more transformations performed on one page by a user to be recorded and reused on other pages of the same web site. As an example, a user may frequently visit a particular web site to read articles. As the web site is likely to have a similar structure for different articles, the user is able to utilize the portable page template of what the user has previously determined to be the most relevant structural components of the web page of the currently viewed web page. As a result, the user is able to quickly print the content that the user thinks is the most relevant on the web page.

In performing addressing of objects, consideration is also given to objects present in one page possibly not being present on the other page. For example, one news story may have a large number of images while another news story may have not images. Further, consideration is also given to not all objects having a descriptive identifier ("ID"). In addition, consideration is given to objects not having any explicit semantic labels. For example, a semantic label may indicate a title of a page, the text of an article, a key picture of a news story, etc. Without explicit semantic labels, a user's intention in performing certain transformations is difficult.

Figure 2:
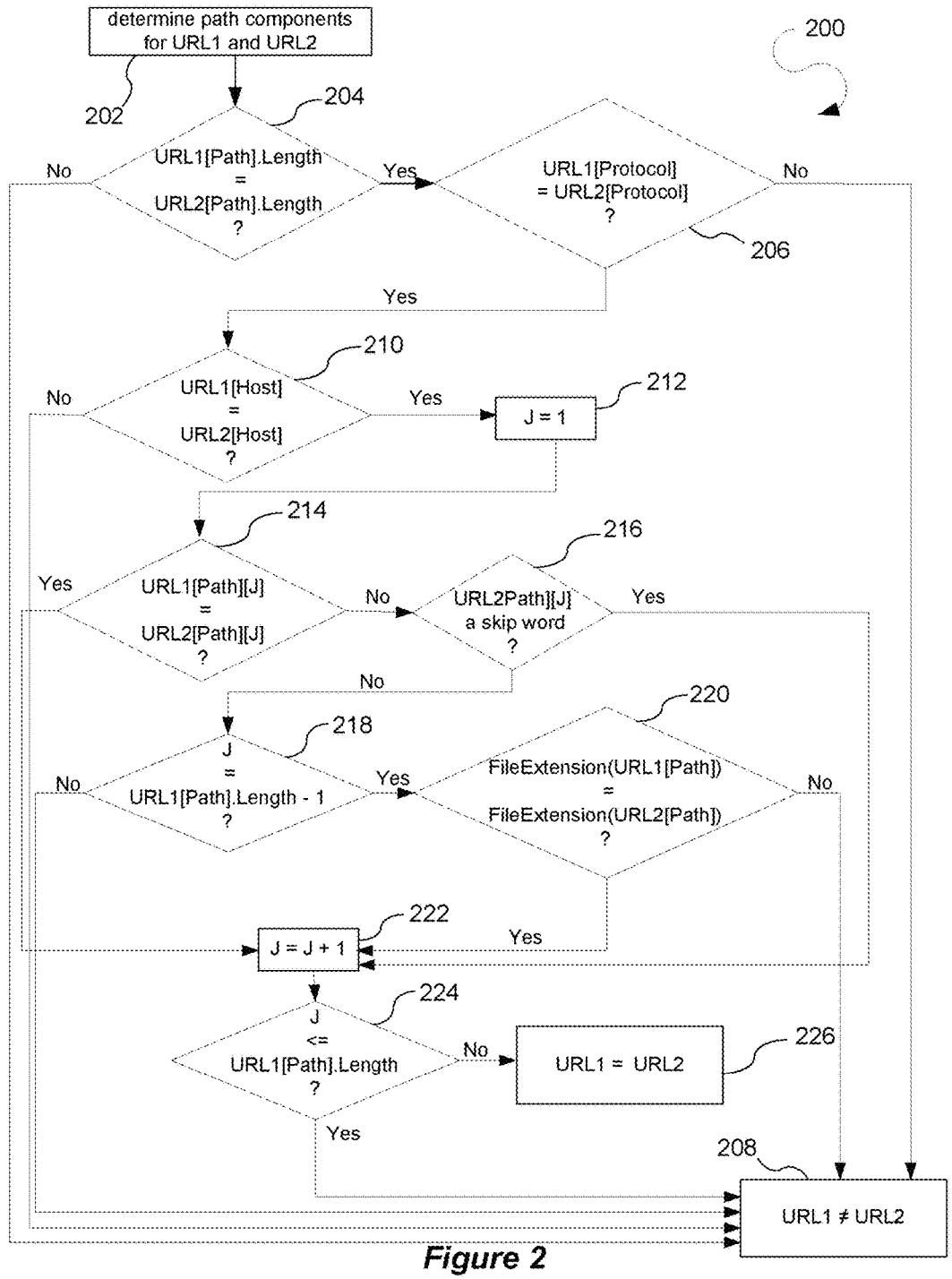
FIG. 2 illustrates a process that may be utilized to by the display configuration to determine similarity between two web pages.

FIG. 2 illustrates a process 200 that may be utilized to by the display configuration 100 to determine similarity between two web pages. If a second URL is determined to be similar to a first URL, a portable page temple for the first URL may be utilized for the second URL. At a first process block 202, the process 200 determines the path components for a first URL and a second URL At a decision block 204, the process 200 determines if URL1[Path].Length equals URL2[Path].Length. The term "Length" is utilized herein to refer to the number of elements in a data structure, e.g., a number of path components in an array. In other words, the process 200 determines if the number of path components of the first URL equals the number of path components of the second URL. If the number of path components is not equal, the process 200 advances to a process block 208 to conclude that the first URL is not similar to the second URL. If the number of path components is equal, the process 200 advances to a decision block 206 to determine if URL1 [Protocol] equals URL2[Protocol]. Protocol names may be strings, e.g., http, https, ftp, or the like. In other words, the process 200 determines if the protocol component of the first URL equals the protocol component of the second URL. If the protocol components are not equal, the process 200 advances to the process block 208 to conclude that the first URL is not similar to the second URL. If the protocol components are equal, the process 200 advances to a decision block 210 to determine if the host component of the first URL equals the host component of the second URL. If the host components are not equal, the process 200 advances to the process block 208 to conclude that the first URL is not similar to the second URL. If the host components are equal, the process 200 advances to a process block 212 to set variable J equal to 1. The process 200 then advances to a decision block 214 to determine if URL1[Path][J] equals URL2[Path][J]. If URL1[Path][J] does not equal URL2 [Path][J], the process 200 advances to a decision block 216 to determine if URL2[Path][J] is a skip word, which is either completely numeric or a string that is commonly utilized to refer to geography, date, time, etc. A skip word is skipped over for the comparison as the skip word is unlikely to affect the formatting of the page that is selected by the user. If URL2Path[J] is not a skip word, the process 200 advances to a decision block 218 to determine if J equals URL1[Path].Length minus 1. If J does not equal URL1 [Path].Length minus 1, the process 200 advances to a process block 208 to conclude that the first URL is not similar to the second URL. If J equals URL1[Path].Length minus 1, the process 200 advances to a process block 222 to increment J by one. The process 200 advances to a decision block 224 to determine if J is less than or equal to URL1 [Path].Length. If J is greater than URL1[Path].Length, the process 200 advances to a process block 226 to conclude that first URL is similar to the second URL. If J is less than or equal to URL1[Path].Length, the process 200 advances to a process block 208 to conclude that the first URL is not similar to the second URL.

Referring back to the decision block 214, if the process 200 determines that URL1[Path][J] equals URL2[Path][J], the process 200 advances to the process block 222 to increment J by one and proceeds forward. Further, referring back to the decision block 218, if the process 200 determines that J equals URL1[Path].Length minus 1, the process 200 advances to a decision block 220 to determine if FileExtension(URL1[Path]) equals FileExtension(URL2[Path]). If FileExtension(URL1[Path]) does not equal FileExtension (URL2[Path]), the process 200 advances to the process block 208 to conclude that the first URL is not similar to the second URL. If FileExtension(URL1[Path]) equals FileExtension(URL2[Path]), the process 200 advances to the process block 222 to increment J by one and proceeds forward.

Figure 3:
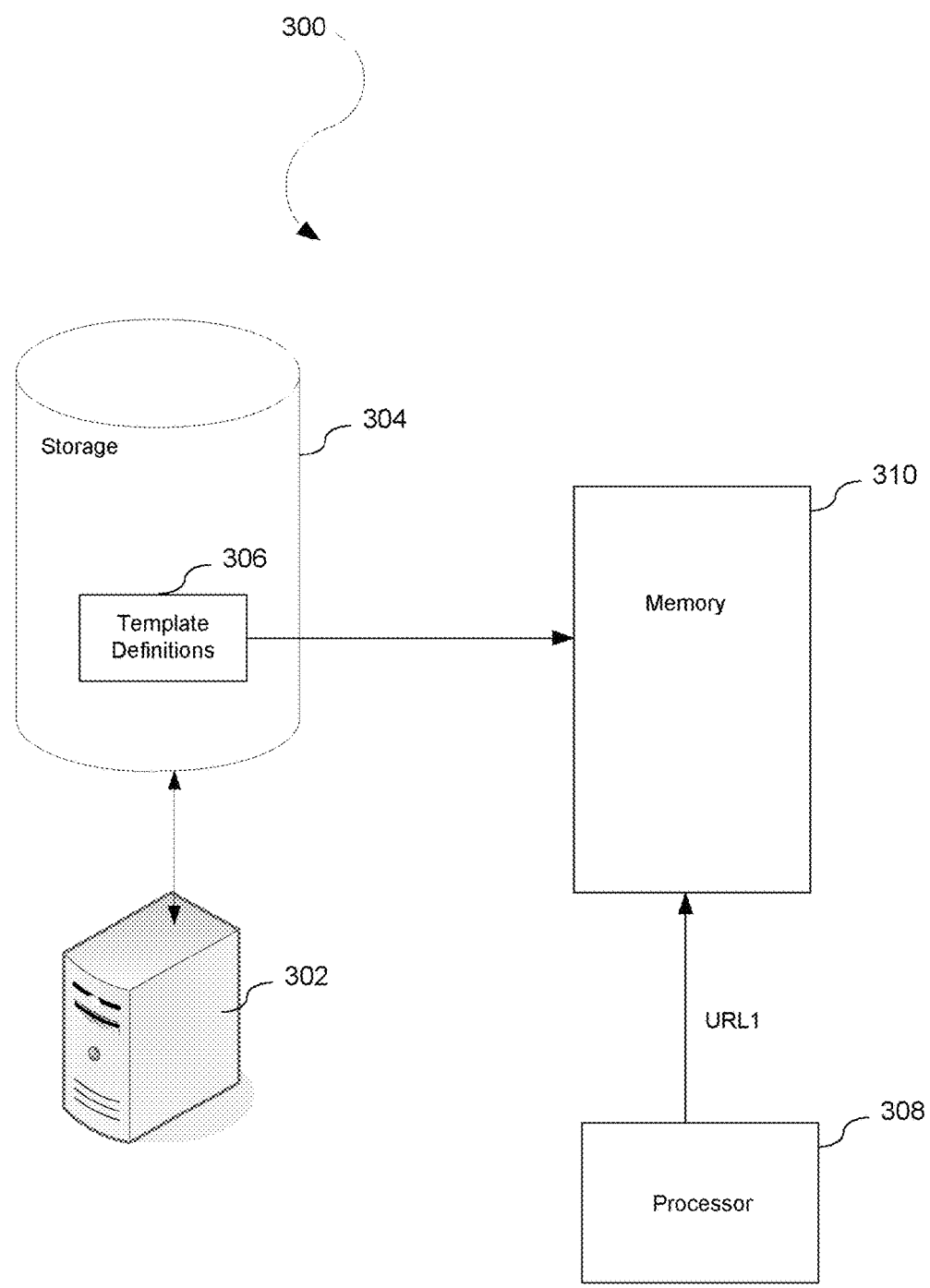
FIG. 3 illustrates a block diagram of a system configuration that selects one or more portable page templates.

FIG. 3 illustrates a block diagram 300 of a system configuration 300 that selects one or more portable page templates. In one embodiment, a set of template definitions 306 is stored in a storage device 304 operably connected to a server 302. The storage device 304 may be a database, memory, disk, etc. In one embodiment, the storage device 304 is integrated within the server 302. In another embodiment, the storage device 304 is not integrated within the server 302. In an alternative embodiment, the storage device 304 is operably connected to an end user's computing device. The set of template definitions may be indexed by the respective URL and host name of the particular template definition. A processor 308 may provide a first URL as an input to a memory 310. In another embodiment, the user directly inputs the first URL into the memory. Each of the stored URLs with the same host name as the first URL may then be read into memory to be compared with the first URL according to the process 200 illustrated in FIG. 2. If a match is found between the first URL and one of the stored URLs, the template for the stored URL is added to a list of available templates for the first URL. The templates may be encoded according a method of encoding information for exchange over http.

Figure 4:
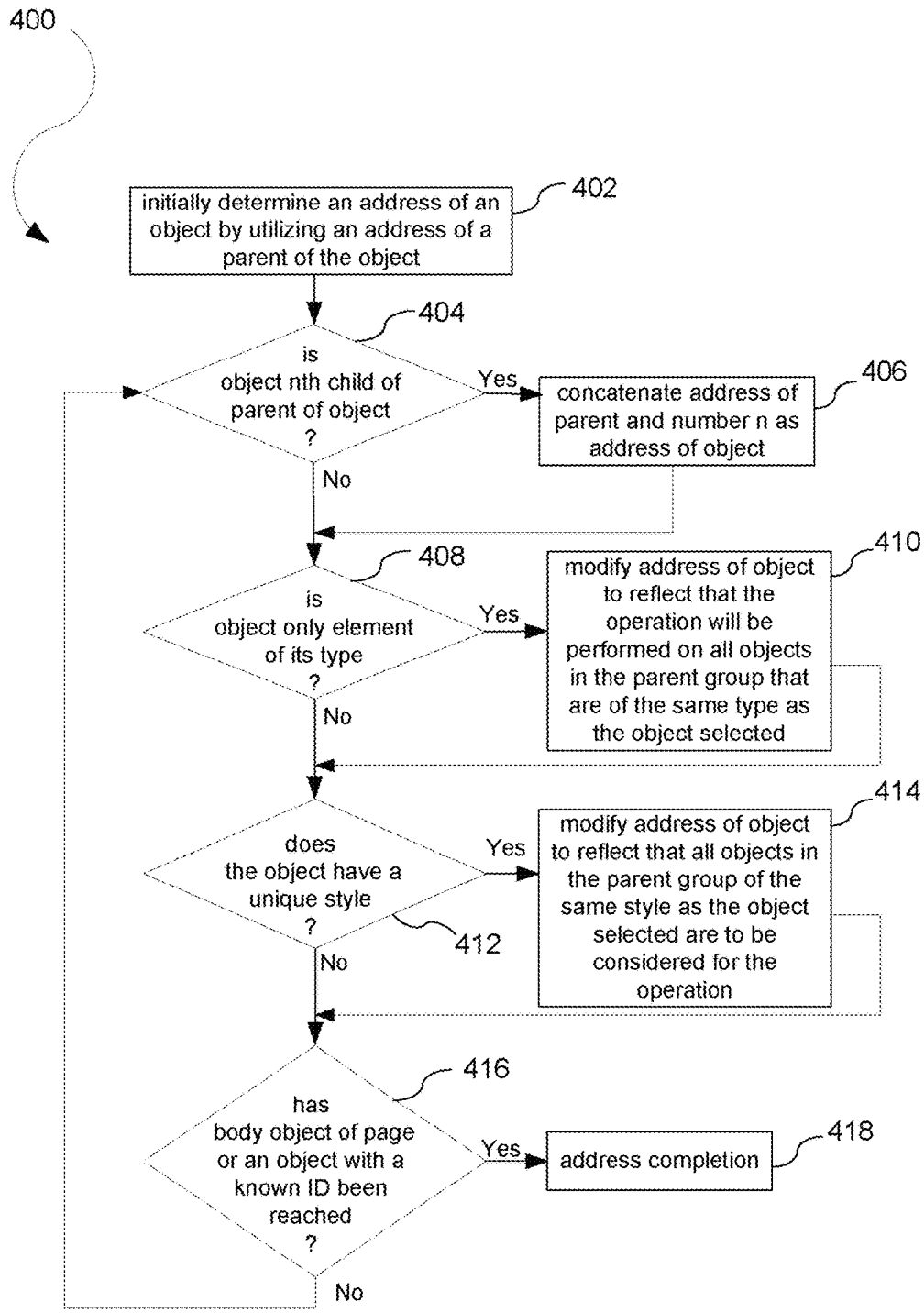
FIG. 4 illustrates a process that performs object addressing according to a path-based approach.

FIG. 4 illustrates a process 400 that performs object addressing according to a path-based approach. The process 400 applies an already stored page template on a given web page to which it is applicable. The object addresses referred to in the template are compared against objects on the current page. When creating the template, a determination is made as to whether or not a selected object is the only child of its type in its parent group and/or whether the selected object does or does not have a unique style. The address of the selected object records data indicating the results of these analyses. When applying the template, this data is utilized. If the address of a template object indicates that the template object had a unique style or that the template object was the only child of its type, the type and/or style of the current page objects are utilized to select objects in the current page.

At a process block 402, the process 400 initially determines an address for an object in question by utilizing the address of the parent of the object. This initial determination may be performed recursively. Further, at a decision block 404, the process 400 determines if the object is the nth child of the object's parent. If the object is not the nth child of the object's parent, the process 400 advances to a decision block 408 to determine if the object is the only element of its type. If the object is the nth child of the object's parent, the process 400 advances to a process block 406 to concatenate the address of the parent and the number n as the address of the object before advancing to the decision block 408 to determine if the object is the only element of its type. A parent level may be skipped under the pretext that the object is visually not the parent of the object in question. For example, if the parent element of an image is a DIV tag, and if the dimensions of the DIV are exactly the same or only slightly larger than the size of the image, the DIV tag is skipped and the next level is considered as the parent of the object. A DIV tag is an HTML element meant to provide a division of the web page into a region so that content in the region can be formatted identically. At the decision block 408, if the process 400 determines that the object is not the only element of its type, the process 400 advances to a decision block 412 to determine if the object has a unique style, e.g., text size, color, and/or font in its parent's group. If the process determines that the object is the only element of its type, the process 400 advances to a process block 410 to modify the address of object to reflect that the operation will be performed on all objects in the parent group that are of the same type as the object selected. If the object does not have a unique style, the process 400 advances to a decision block 416 to determine if the body object of the page or an object with a known identifier ("ID") been reached. If the object does have a unique style, the process 400 advances to the process block 414 to modify the address of object to reflect that all objects in the parent group of the same style as the object selected are to be considered for the operation before proceeding to the decision block 416 to determine if the body object of the page or an object with a known ID been reached. At the decision block 416, if the body object of the page or an object with a known identifier ("ID") has been reached, the process 400 advances to a process block 418 for address completion. If the body object of the page or an object with a known identifier ("ID") has not been reached, the process 400 advances to the process block 404 to recursively be applied to the parent object.

In one embodiment, the addresses of all object addresses for a particular operation are compared to form a common prefix, which is removed from all the addresses and stored separately. Such removal results in compact storage.

In one embodiment, the most relevant content on a page is captured automatically. Further, in one embodiment, the user may be provided with tools to easily select the content that they user wishes to print. The set of transformations performed by the user may include isolation and deletion of content.

In one embodiment, the process 400 utilizes a greedy approach. The transformations are ranked by influence.

Figure 5A:
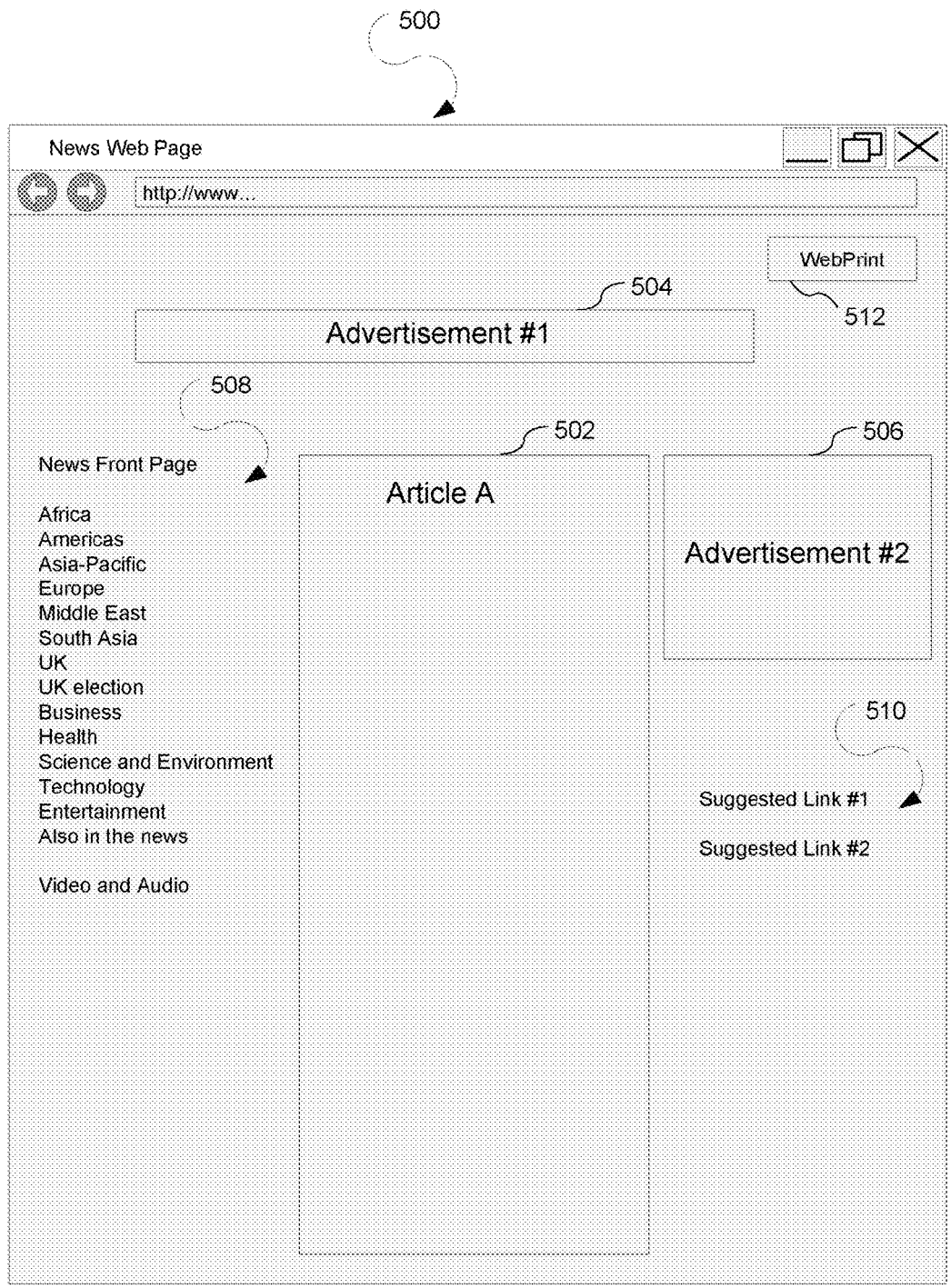
FIG. 5A illustrates an example of a web page in an original format.

FIG. 5A illustrates an example of a web page 500 in an original format. As an example, the web page 500 is illustrated as a news web page. The web page 500 is an input document for a web print operation. The web page 500 has an article 502 entitled Article A. Further, the web page 500 has additional items such as a first advertisement 504, a second advertisement 506, and a plurality of suggested links 510. The web page 500 also has a plurality of web site navigation links 508 to help the user find other web pages hosted by the web site based on a variety of other geographic areas and subjects. Further, the web page 500 includes a WebPrint button 512 that the user may utilize to create a portable page template. As alternative configurations may be utilized without printing, the WebPrint button 512 may be entitled WebView button or the like to indicate that user may simply view without having to print.

Figure 5B:
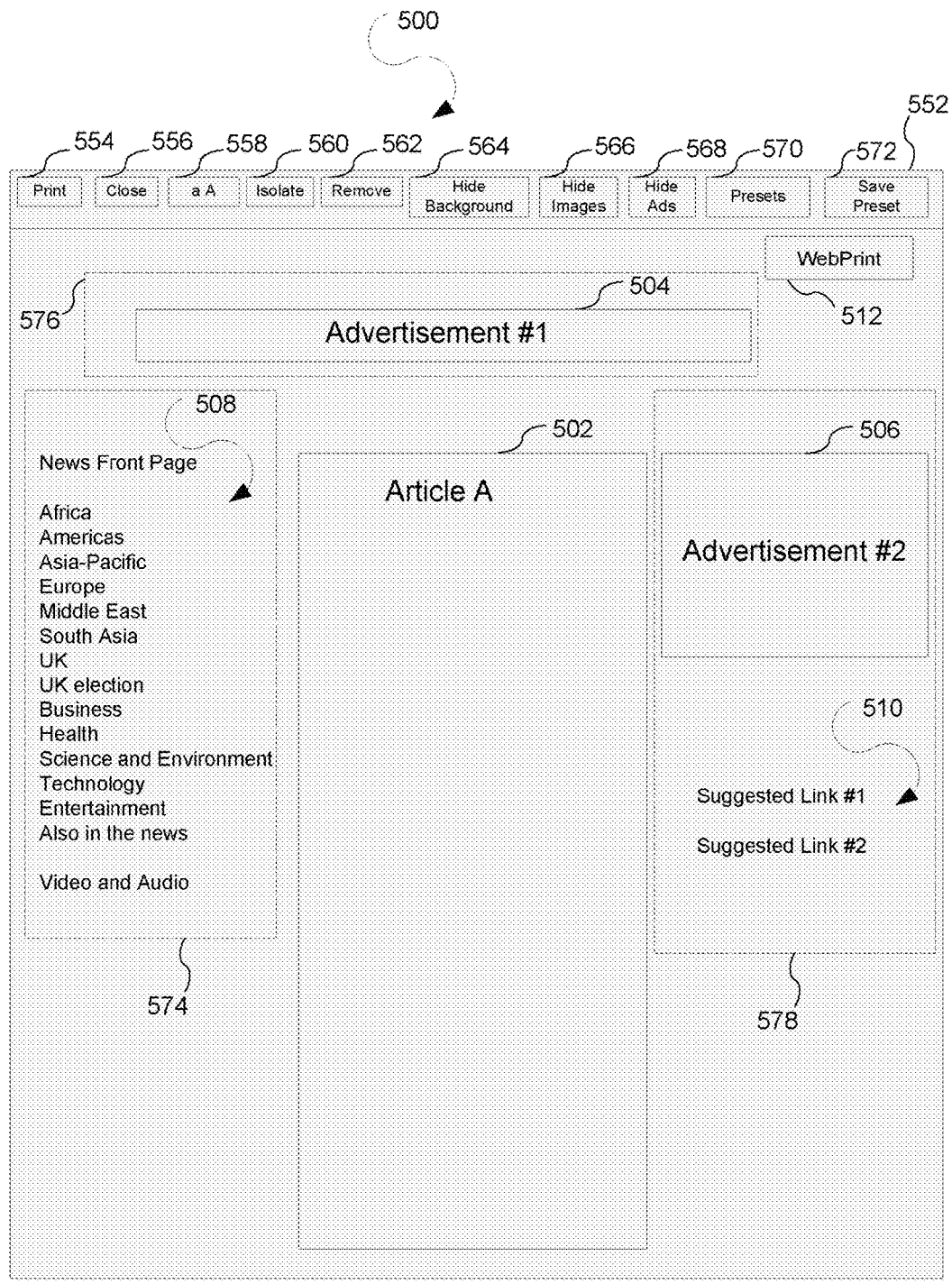
FIG. 5B illustrates an example of selections by a user of content to be printed from the web page.

Further, FIG. 5B illustrates an example of selections by a user of content to be printed from the web page 500. After the user selects the WebPrint button 512 from FIG. 5A, the user may utilize a toolbar 552 to select content from the web page to be isolated and deleted for printing and/or viewing purposes. In one embodiment, the toolbar 552 includes a print button 554, a close button 556, a font size button 558, an isolate button 560, a remove button 562, a hide background button 564, a hide images button 566, a hide ads button 568, a presets button 570, and a save preset button 572. The user may select regions to be isolated and click the isolate button 560. The user may also select regions to be removed with the remove button 562. As an example, the user may utilize a mouse pointer to select the plurality of web site navigation links 508 in a first selectable region 574, a the first advertisement 504 in a second selectable region 576, and the second advertisement 506 and the plurality of suggested links 510 in a third selectable region 578 such that the selectable regions are to be removed. The user would then have the remaining article 502 to view and/or print. Alternatively, the user may select the article by utilizing a selectable region to indicate the article 502 and select the isolate button 560.

Instead of utilizing selectable regions, the user may utilize particular buttons to remove certain types of content. For example, the user may press the hide background button 564 to remove the background. The user may also press the hide images button 566 to remove the images. Further, the user may select the hide ads button 568 to remove the advertisements. The user may also select from pervious presets with the presets button 570.

Figure 5C:
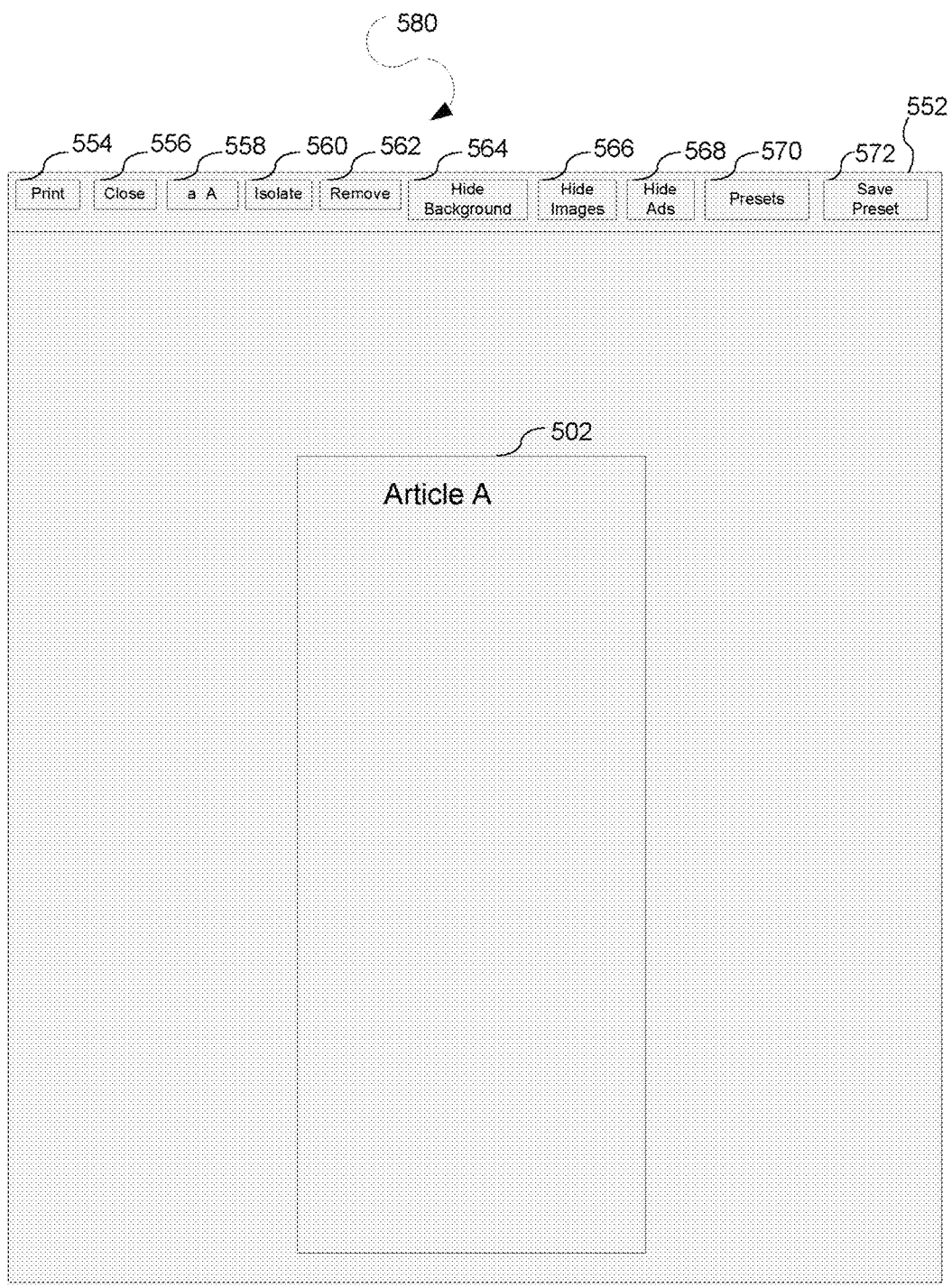
FIG. 5C illustrates an output web page that results from the transformations performed on the web page illustrated in FIG. 5B.

FIG. 5C illustrates an output web page 575 that results from the transformations performed on the web page 500 illustrated in FIG. 5B. The article 502 remains so that the user may view and/or print the article without the other content. The user may save the set of transformations by utilizing the save preset button.

Figure 5D:
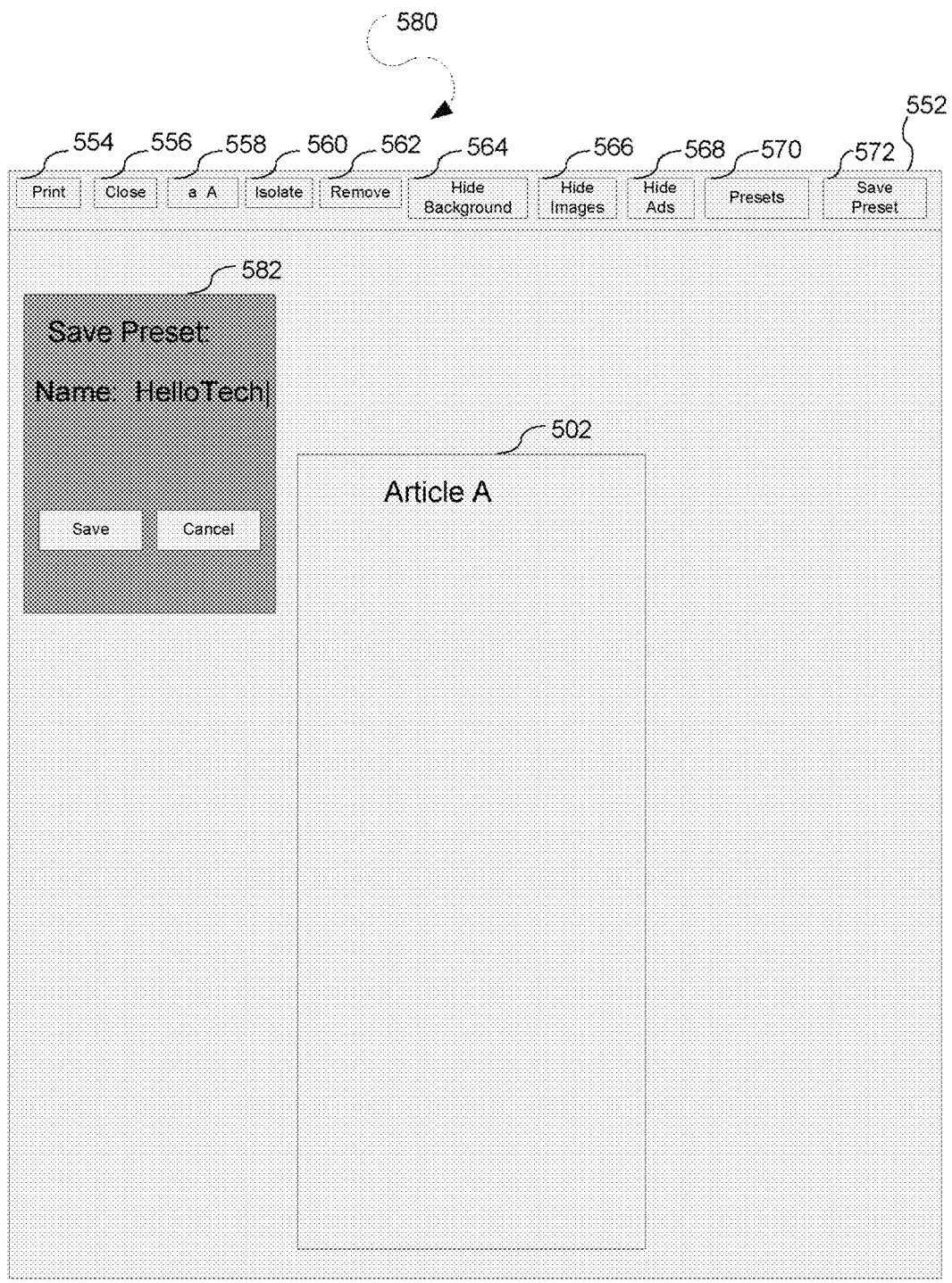
FIG. 5D illustrates a save preset box that is displayed so that a user may save the preset as a file.

FIG. 5D illustrates a save preset box 582 that is displayed so that a user may save the preset as a file. As an example, the preset is given the file name HelloTech. The user may then later retrieve the preset and apply the same set of transformations to a different web page at the same web site.

Figure 6A:
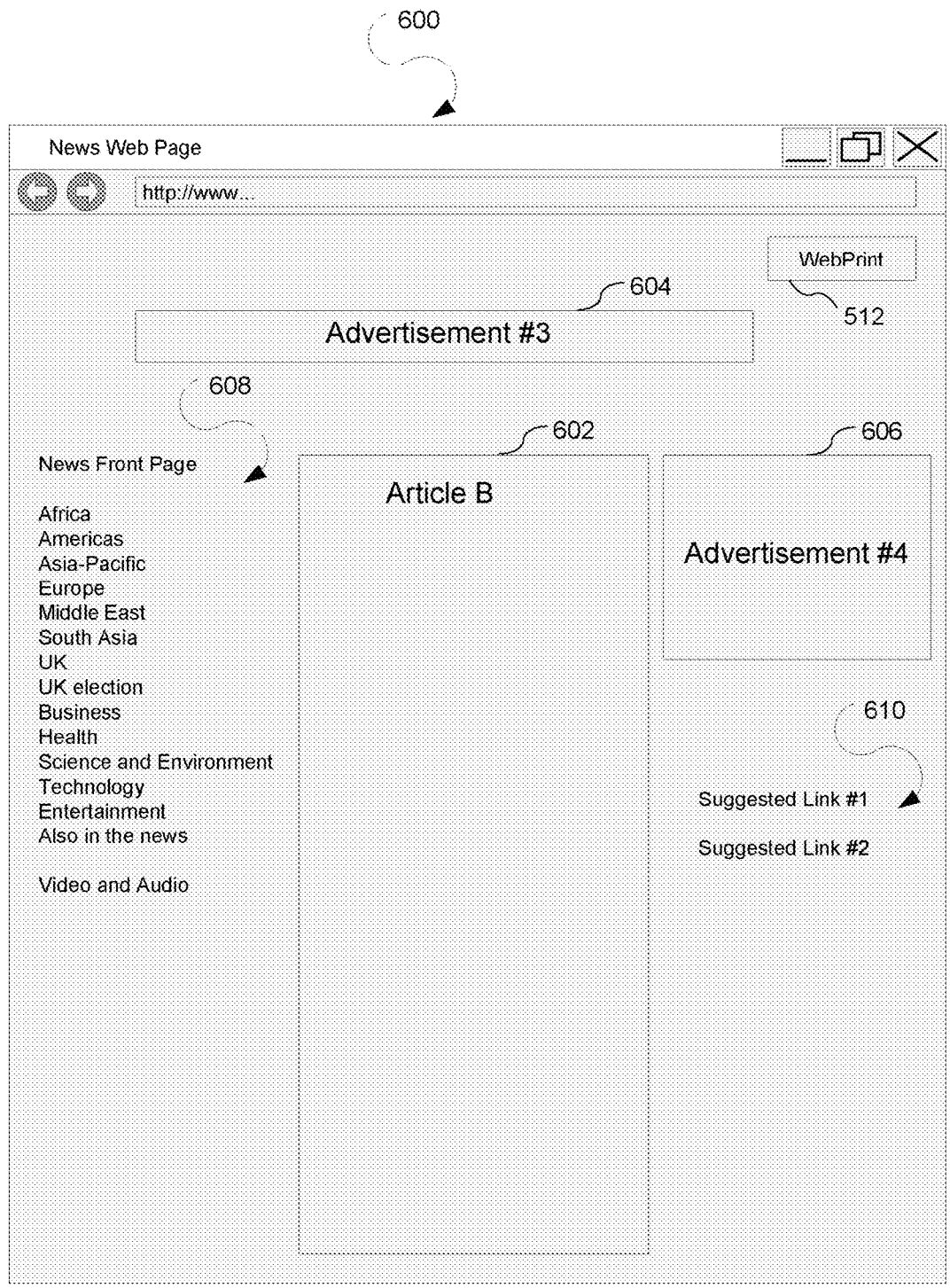
FIG. 6A illustrates a different an example of a different web page.

FIG. 6A illustrates a different an example of a different web page 600. The web page 600 is an input document for a web print operation that is from the same web site as the web page 500 illustrated in FIG. 5A. Further, the structure of the web page 600 is similar to that of the web page 500 illustrated in FIG. 5A. The web page 600 has an article 602 entitled Article B. Further, the web page 600 has additional items such as a third advertisement 604, a fourth advertisement 606, and a plurality of suggested links 610. The web page 600 also has a plurality of web site navigation links 608 to help the user find other web pages hosted by the web site based on a variety of other geographic areas and subjects. The user may select the Presets button 570 to select a portable page template such as HelloTech.

Figure 6B:
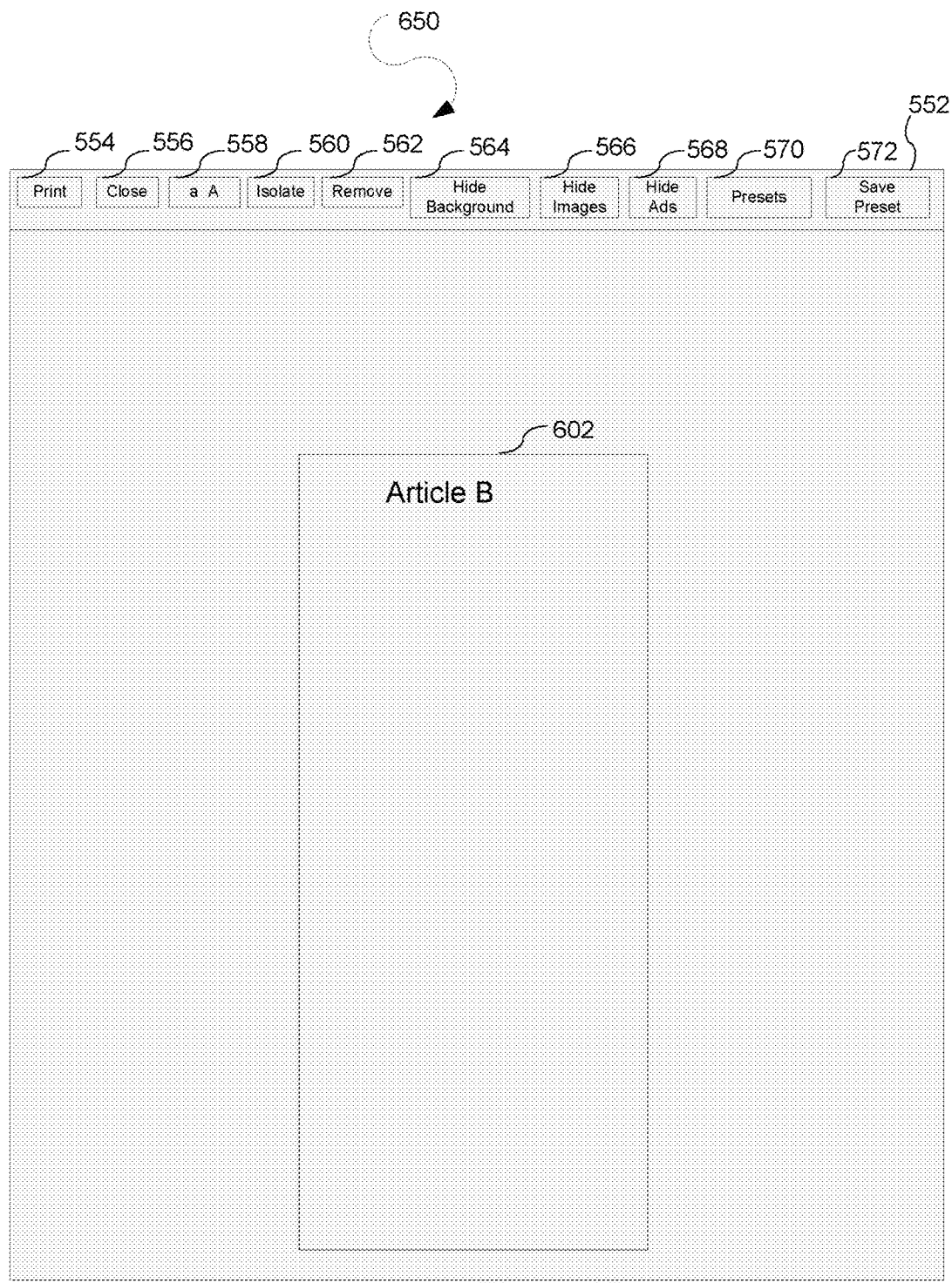
FIG. 6B illustrates an output web page that results from the transformations a portable page template performed on the web page illustrated in FIG. 6A.

FIG. 6B illustrates an output web page 650 that results from the transformations a portable page template performed on the web page 600 illustrated in FIG. 6A. By selecting the HelloTech preset, the user allows the same transformations applied to the web page 500 illustrated in FIG. 5A to be applied to the web page 600 illustrated in FIG. 6A. The user does not have to through the process again of selecting which advertisements, backgrounds, etc. that the user would like to see when reading another news article on the same web site. The user may select the preset and see Article B without the other content.

Although the illustrated examples depict web pages that remove all the content other than the articles, a user may create a preset that leaves some of the content along with the article. For example, the user may wish to print and/or view the suggested links, but not the advertisements.

In one embodiment, the structure of the web page is determined by analyzing the fields in a database associated with the web page. For example, a particular field may be established for the news article, another filed may be established for an advertisement, etc. The selection from the preset may be applied to different web pages by utilizing the fields in the database.

Although the illustrated examples involve a print feature, the portable page template may be utilized solely for viewing. As an example, a user may only want to look at articles without advertisements when visiting a particular web site, but may not want to print. The portable page template allows the user to apply the transformations for a comfortable viewing experience.

Further, in one embodiment, the portable page template may only be utilized for web pages as the same web site. In an alternative embodiment, the portable page template may be utilized for web pages at different web sites. As an example, a first web page at a first news web site may have a similar structure to a second web page at a second news web site. Accordingly, the portable page template constructed for the second web page may be utilized for the first web page.

Figure 7:
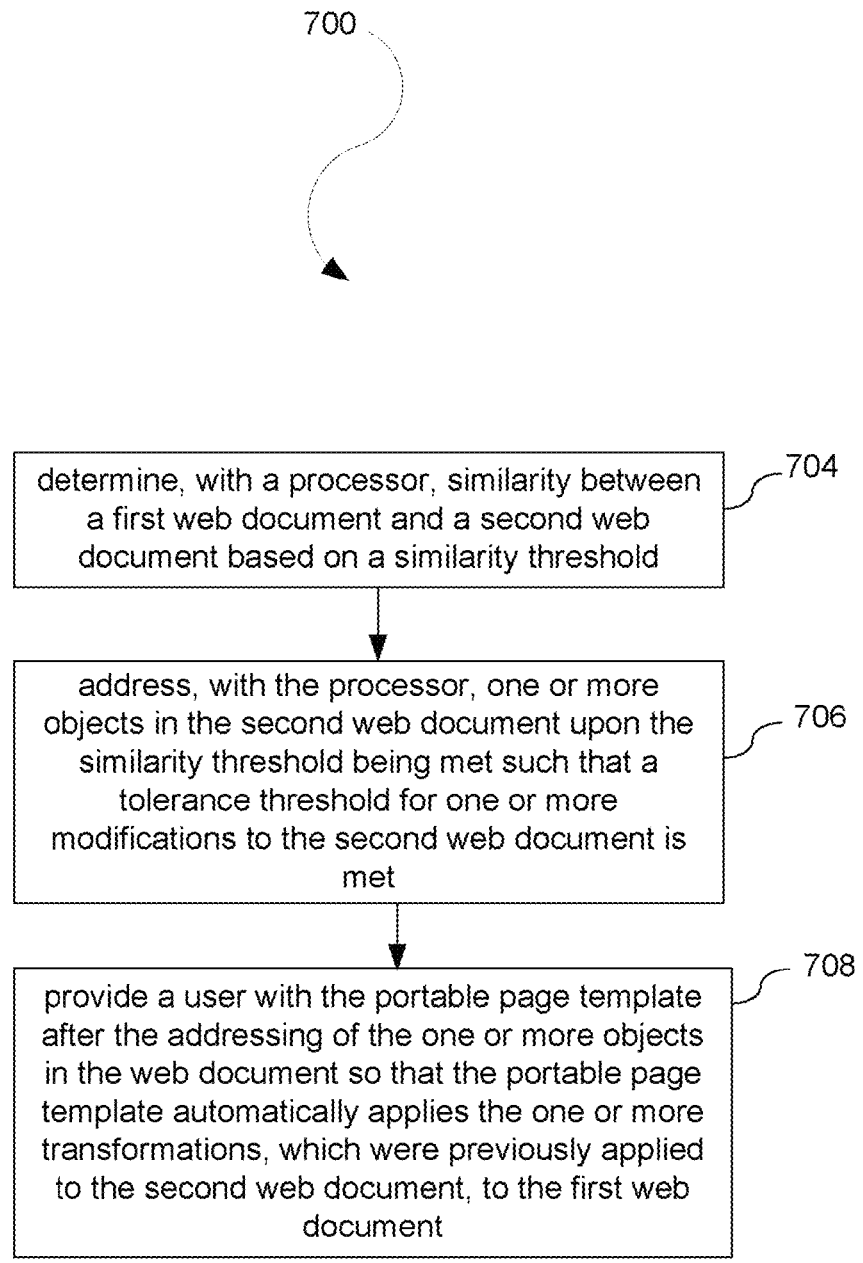
FIG. 7 illustrates a process that may be utilized to provide a portable page template.

FIG. 7 illustrates a process 700 that may be utilized to provide a portable page template. At a process block 702, the process 700 determines, with a processor, similarity between a first web document and a second web document based on a similarity threshold. The second web document has a portable page template associated therewith that includes one or more predetermined transformations that were previously applied to the second web document. In addition, at a process block 704, the process 700 addresses, with the processor, one or more objects in the second web document upon the similarity threshold being met such that a tolerance threshold for one or more modifications to the second web document is met. At a process block 706, the process 700 provides provide a user with the portable page template after the addressing of the one or more objects in the web document so that the portable page template automatically applies the one or more transformations, which were previously applied to the second web document, to the first web document.

Figure 8:
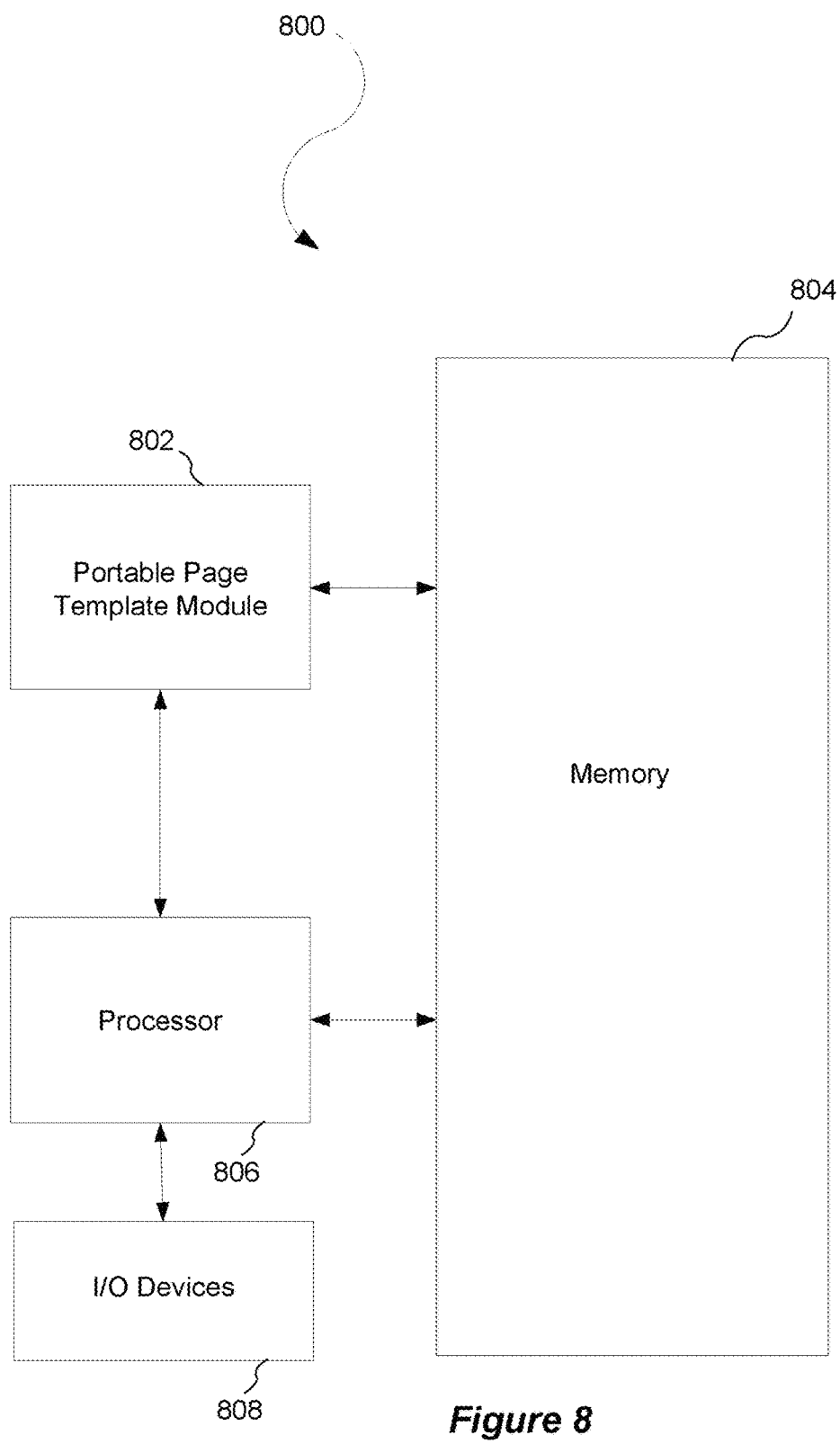
FIG. 8 illustrates a system configuration that may be utilized for a portable page template.

FIG. 8 illustrates a system configuration 800 that may be utilized for a portable page template. In one embodiment, a portable page template module 802 interacts with a memory 804. The portable page template module 802 generates one or more portable page templates. Further, a processor 806 applies the transformations from the one or more portable page templates generated by the portable page template module 802. The processor 806 interacts with input/output ("I/O") devices 808. For example, the processor 806 receives an input from a user through a keyboard to print the document. The processor 806 may then print an output document based on a portable page template on a printer.

In one embodiment, the system configuration 800 is suitable for storing and/or executing program code and is implemented using a general purpose computer or any other hardware equivalents. The processor 806 is coupled, either directly or indirectly, to the memory 804 through a system bus. The memory 804 can include local memory employed during actual execution of the program code, bulk storage, and/or cache memories which provide temporary storage of at least some program code in order to reduce the number of times code must be retrieved from bulk storage during execution.

The I/O devices 808 can be coupled directly to the system 800 or through intervening input/output controllers. Further, the I/O devices 808 can include a keyboard, a keypad, a mouse, a microphone for capturing speech commands, a pointing device, and other user input devices that will be recognized by one of ordinary skill in the art. Further, the I/O devices 808 can include output devices such as a printer, display screen, or the like. Further, the I/O devices 808 can include a receiver, transmitter, speaker, display, image capture sensor, biometric sensor, etc. In addition, the I/O devices 808 can include storage devices such as a tape drive, floppy drive, hard disk drive, compact disk ("CD") drive, etc.

Network adapters may also be coupled to the system configuration 800 to enable the system configuration 800 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes and systems. Therefore, it is to be understood that, within the scope of the appended claims, the present processes and systems may be practiced other than as specifically described herein.

We claim:

1. A system comprising:
   one or more processors; and
   at least one computer useable storage device having a computer readable program that is executable via the one or more processors to cause the system to perform operations including:
   determining similarity between a first web document and a second web document based on a similarity threshold, the second web document being different from the first web document and having a portable page template associated therewith, the portable page template including one or more predetermined transformations that were previously applied to the second web document;
   addressing an object in the second web document upon the similarity threshold being met such that a tolerance threshold for one or more modifications to the second web document is met, said addressing including:
   utilizing an address for a parent element of the object as an initial address for the object;
   generating a modified address for the object by modifying the initial address based on whether the object is the only element in the second web document of a particular type, and whether the object has a unique style that is unique with regard to one or more other child elements of the parent element in the second web document, the unique style referring to one or more of a text size, a color, or a font of the object, and the modified address reflecting within the modified address one or more of whether the object is the only element in the second web document of a particular type or whether the object has a unique style;

comparing the modified address to addresses for objects of the first web document to identify an object in the first web document that corresponds to the object in the second web document;

applying the portable page template to the first web document based on the addressing of the object in the second web document so that the portable page template automatically applies the one or more predetermined transformations, which were previously applied to the second web document, to the first web document such that content from the first web document is formatted for at least one of printing or display based on how content from the second web document was formatted for at least one of printing or display, said applying including applying at least one transformation that was applied to the object in the second web document, to the object in the first web document.

2. The system of claim 1, wherein the first web document and the second web document are hosted by a same web site.

3. The system of claim 1, wherein the first web document and the second web document are hosted by different web sites.

4. The system of claim 1, wherein the one or more predetermined transformations include isolation of a particular type of content displayed in the second web document.

5. The system of claim 1, wherein the one or more predetermined transformations include deletion of a particular type of content displayed in the second web document.

6. The system of claim 1, wherein the similarity determination is based on a comparison of a first uniform resource locator associated with the first web document and a second uniform resource locator associated with the second web document.

7. The system of claim 1, wherein the portable page template is stored in a storage device.

8. A method comprising:

determining, with a processor, similarity between a first web document and a second web document based on a similarity threshold, the second web document being different from the first web document and having a portable page template associated therewith, the portable page template including one or more predetermined transformations that were previously applied to the second web document;

addressing, with the processor, an object in the second web document upon the similarity threshold being met such that a tolerance threshold for one or more modifications to the second web document is met, said addressing including:

utilizing an address for a parent element of the object as an initial address for the object;

generating a modified address for the object by modifying the initial address based on whether the object is the only element in the second web document of a particular type, and whether the object has a unique style that is unique with regard to one or more other child elements of the parent element in the second web document, the unique style referring to one or more of a text size, a color, or a font of the object, and the modified address reflecting within the modified address one or more of whether the object is the only element in the second web document of a particular type or whether the object has a unique style;

comparing the modified address to addresses for objects of the first web document to identify an object in the first web document that corresponds to the object in the second web document;

applying the portable page template to the first web document based on the addressing of the object in the second web document so that the portable page template automatically applies the one or more predetermined transformations, which were previously applied to the second web document, to the first web document such that content from the first web document is formatted for at least one of printing or display based on how content from the second web document was formatted for at least one of printing or display, said applying including applying at least one transformation that was applied to the object in the second web document, to the object in the first web document.

9. The method of claim 8, wherein the first web document and the second web document are hosted by a same web site.

10. The method of claim 8, wherein the first web document and the second web document are hosted by different web sites.

11. The method of claim 8, wherein the one or more predetermined transformations include isolation of a particular type of content displayed in the second web document.

12. The method of claim 8, wherein the one or more predetermined transformations include deletion of a particular type of content displayed in the second web document.

13. The method of claim 8, wherein the similarity determination is based on a comparison of a first uniform resource locator associated with the first web document and a second uniform resource locator associated with the second web document.

14. The method of claim 8, wherein the portable page template is stored in a storage device.

15. A system comprising:

a processor configured to perform operations including:

causing the system to determine a similarity between a first web document and a second web document, the second web document being different than the first web document and having a portable page template associated therewith, the portable page template including one or more predetermined transformations that were previously applied to the second web document;

addressing an object in the second web document, said addressing including:

utilizing an address for a parent element of the object as an initial address for the object; and generating a modified address for the object by modifying the initial address based on whether the object is the only element in the second web document of a particular type, and whether the object has a unique style that is unique with regard to one or more other child elements of the parent element in the second web document, the unique style referring to one or more of a text size, a color, or a font of the object, and the modified address reflecting within the modified address one or more of whether the object is a child object of a parent object or whether the object has a unique style; and comparing the modified address to addresses for objects of the first web document to identify an object in the first web document that corresponds to the object in the second web document; and an output module configured to perform operations including applying the portable page template to the first web document based on the addressing of the object in the second web document such that the one or more predetermined transformations are automatically applicable by the portable page template to the first web document such that content from the first web document is formatted for at least one of printing or display based on how content from the second web document was formatted for at least one of printing or display, said applying including applying at least one transformation that was applied to the object in the second web document, to the object in the first web document.

16. The system of claim 15, wherein the first web document and the second web document are hosted by a same web site.

17. The system of claim 15, wherein the first web document and the second web document are hosted by different web sites.

18. The system of claim 15, wherein the one or more predetermined transformations include isolation of a particular type of content displayed in the second web document.

19. The system of claim 15, wherein the one or more predetermined transformations include deletion of a particular type of content displayed in the second web document.

20. The method of claim 15, wherein the similarity determination is based on a comparison of a first uniform resource locator associated with the first web document and a second uniform resource locator associated with the second web document.

* * * * *